US012361636B2

(12) United States Patent
Jayatunga et al.

(10) Patent No.: US 12,361,636 B2
(45) Date of Patent: Jul. 15, 2025

(54) IMAGE GENERATION BASED ON TRACKED 3D SCANNING

(71) Applicant: Shopify Inc., Ottawa (CA)

(72) Inventors: Hettige Ray Perera Jayatunga, Toronto (CA); Jonathan Wade, Ottawa (CA)

(73) Assignee: SHOPIFY INC., Ottawa (CA)

( * ) Notice: Subject to any disclaimer, the term of this patent is extended or adjusted under 35 U.S.C. 154(b) by 63 days.

(21) Appl. No.: 17/957,797

(22) Filed: Sep. 30, 2022

(65) Prior Publication Data

US 2023/0394751 A1    Dec. 7, 2023

Related U.S. Application Data

(60) Provisional application No. 63/347,637, filed on Jun. 1, 2022.

(51) Int. Cl.
*G06T 17/00* (2006.01)
*G01S 7/481* (2006.01)

(52) U.S. Cl.
CPC ............ *G06T 17/00* (2013.01); *G01S 7/4817* (2013.01)

(58) Field of Classification Search
None
See application file for complete search history.

(56) References Cited

U.S. PATENT DOCUMENTS

| | | | |
|---|---|---|---|
| 9,094,670 B1* | 7/2015 | Furio | G06T 19/20 |
| 2019/0180586 A1* | 6/2019 | Script | G06T 7/50 |
| 2020/0045249 A1* | 2/2020 | Francois | G06F 3/0484 |
| 2022/0012509 A1* | 1/2022 | Tagawa | B62D 15/021 |
| 2023/0115660 A1* | 4/2023 | Sivakumar | H04N 17/002 348/187 |
| 2023/0186563 A1* | 6/2023 | Coffman | G06T 7/0002 345/419 |

FOREIGN PATENT DOCUMENTS

WO    WO-2023058098 A1 *    4/2023

\* cited by examiner

*Primary Examiner* — Aaron M Richer
(74) *Attorney, Agent, or Firm* — Smart & Biggar LP

(57) ABSTRACT

The present disclosure provides image generation systems and methods. The image generation method includes capturing a first 2D image corresponding to a first perspective of a 3D object, and associating the first 2D image with a set of 3D scanning data, the set of 3D scanning data comprising 3D data points corresponding to the first perspective of the 3D object. The method includes obtaining new 3D data points to include in the set of 3D scanning data from a subsequent perspective of the 3D object, the new 3D data points being non-overlapping with 3D data points already in the set of 3D scanning data. The method further includes, responsive to determining that a number of the new 3D data points exceeds a predetermined threshold, automatically capturing a subsequent 2D image corresponding to the subsequent perspective, and associating the subsequent 2D image with the new 3D data points.

20 Claims, 8 Drawing Sheets

FIG. 3

IMAGE GENERATION BASED ON TRACKED 3D SCANNING

FIELD

The present disclosure is related to imaging systems and methods. In particular, the present disclosure is related to 3D scanning, and more particularly to tracking 3D scanning of a 3D object to automatically generate 2D images that provide full coverage of the 3D product.

BACKGROUND

Three-dimensional (3D) model data representing a 3D object can be rendered to produce 2D images of that object. Such a 3D object may be generated in a variety of manners, including by 3D scanning. 3D models may correspond to real-world objects and may, in at least some cases, constitute realistic representations of such real-world objects. The appearance of a 3D object when rendered for display can vary depending on the parameters used in rendering it. For example, parameters such as lighting and viewpoint may be varied to provide different 2D representations of the same 3D object. In a particular example, different simulated lighting conditions may alter how the color, texture and/or other material properties of the virtual object appear in the rendered object.

SUMMARY

Ensuring that a comprehensive set of 2D images are generated often requires numerous manual user inputs, and the taking of many redundant 2D images, making the process inefficient and time consuming. Thus, in some examples, the present disclosure describes an imaging system comprising: a processing unit configured to execute instructions to cause the system to: capture a first two dimensional (2D) image corresponding to a first perspective of a three dimensional (3D) object, and associate the first 2D image with a set of 3D scanning data, the set of 3D scanning data comprising 3D data points corresponding to the first perspective of the 3D object; obtain new 3D data points to include in the set of 3D scanning data from a subsequent perspective of the 3D object, the new 3D data points being non-overlapping with 3D data points already in the set of 3D scanning data; and responsive to determining that a number of the new 3D data points exceeds a predetermined threshold, automatically capture a subsequent 2D image corresponding to the subsequent perspective, and associating the subsequent 2D image with the new 3D data points.

In some examples, the present disclosure describes a computer-implemented method comprising: capturing a first two dimensional (2D) image corresponding to a first perspective of a three dimensional (3D) object, and associating the first 2D image with a set of 3D scanning data, the set of 3D scanning data comprising 3D data points corresponding to the first perspective of the 3D object; obtaining new 3D data points to include in the set of 3D scanning data from a subsequent perspective of the 3D object, the new 3D data points being non-overlapping with 3D data points already in the set of 3D scanning data; and responsive to determining that a number of the new 3D data points exceeds a predetermined threshold, automatically capturing a subsequent 2D image corresponding to the subsequent perspective, and associating the subsequent 2D image with the new 3D data points.

In some examples, the present disclosure describes a computer-readable medium storing instructions that, when executed by a processor of a system, causes the system to: capture a first two dimensional (2D) image corresponding to a first perspective of a three dimensional (3D) object, and associate the first 2D image with a set of 3D scanning data, the set of 3D scanning data comprising 3D data points corresponding to the first perspective of the 3D object; obtain new 3D data points to include in the set of 3D scanning data from a subsequent perspective of the 3D object, the new 3D data points being non-overlapping with 3D data points already in the set of 3D scanning data; and responsive to determining that a number of the new 3D data points exceeds a predetermined threshold, automatically capture a subsequent 2D image corresponding to the subsequent perspective, and associating the subsequent 2D image with the new 3D data points.

In any of the above examples, obtaining of new 3D data points and the automatic capturing of the subsequent 2D image is repeated, and, responsive to determining that the set of 3D scanning data forms a closed surface, the obtaining of new 3D data points, and storing the set of 3D scanning data as a 3D model with the first and subsequent 2D images is automatically ended.

In any of the above examples, the 3D data points of the set of 3D scanning data from the first perspective of the 3D object is obtained with a scanning device.

In any of the above examples, a first timestamp is associated with the first 2D image and the 3D data points that are in the set of 3D scanning data at the time the first 2D image is captured, and a subsequent timestamp is associated with the subsequent 2D image and the new 3D data points.

In any of the above examples, instructions are provided to a user to move the 3D object or the scanning device to change from the first perspective to the subsequent perspective.

In any of the above examples, the set of 3D scanning data comprises polygon mesh data.

In any of the above examples, the set of 3D scanning data of the 3D object is compared with a reference 3D model of the 3D object to identify non-matching 3D data points therebetween, the non-matching 3D data points indicating a possible defect in the 3D object.

In any of the above examples, one or more corresponding 2D images from the first and subsequent 2D images, with the same timestamp as that of the non-matching 3D data points, is identified, the one or more corresponding 2D images showing the defect.

In any of the above examples, the one or more corresponding 2D images is provided to an e-commerce platform or to a merchant device.

In any of the above examples, the reference 3D model of the 3D object is received from an e-commerce platform or from a merchant device.

In any of the above examples, the first and subsequent 2D images are provided to an e-commerce platform or to a merchant device.

BRIEF DESCRIPTION OF THE DRAWINGS

Reference will now be made, by way of example, to the accompanying drawings which show example embodiments of the present application, and in which:

FIG. 3 is an example homepage of an administrator, which may be accessed via the e-commerce platform of FIG. 2;

Similar reference numerals may have been used in different figures to denote similar components.

DESCRIPTION OF EXAMPLE EMBODIMENTS

The present disclosure provides user-friendly systems and methods for tracking 3D scanning data of a 3D object to automatically trigger image capture during manipulation of the object and/or the image capture device (such as a camera), thus generating comprehensive 2D images of a 3D object. The disclosed systems and methods track 3D scanning data of the 3D object to identify when at least a predetermined number/amount of new 3D data has been obtained, this indicates that the scanner has moved to a new/unique perspective relative to the 3D object. This determination automatically triggers 2D image capture of the 3D object at that new perspective without further input from the user. As such, the user merely needs to manipulate the object and/or image capture device to obtain 2D images. In various examples, the disclosed systems and methods may help to ensure that sufficient 2D images are captured such that the 2D images provide views of the 3D object from different perspectives (e.g., sufficient to ensure full coverage of the 3D object), without requiring additional user input or prompts. Further, in some examples, the disclosed systems and methods may enable automatic identification of a 2D image that shows a point of interest in the 3D object, without requiring manual selection. In this way, user interactions may be greatly simplified and computing resources may be used more efficiently.

Figure 1:
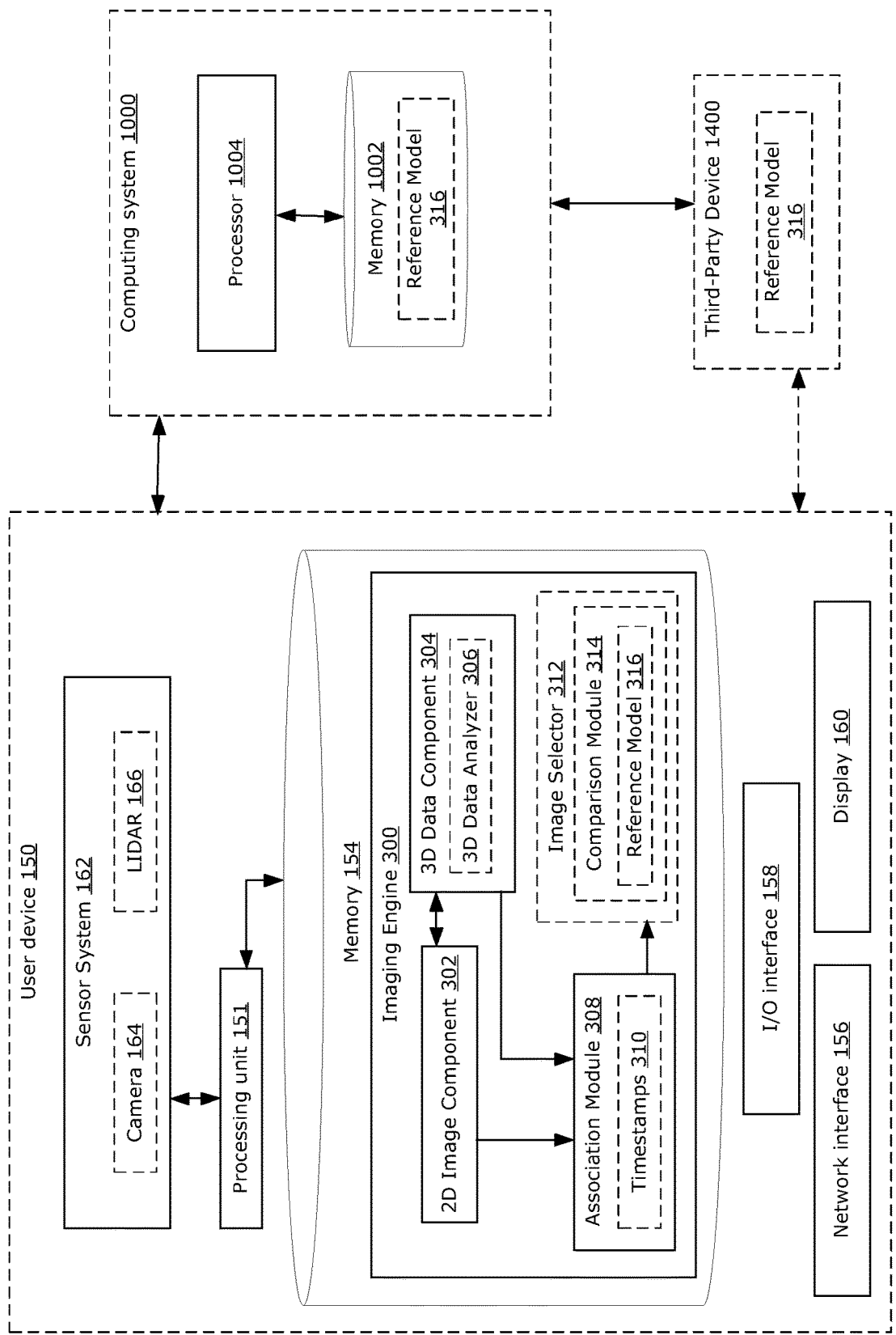
FIG. 1 is a is a block diagram of an embodiment of a user device of the present disclosure including an imaging engine in which examples described herein may be implemented.

Systems and methods of tracking 3D scans and automatically generating 2D images that provide full coverage of a 3D product, may be employed in association with a user device 150, as shown in FIG. 1. An imaging application might be provided to allow for comprehensive 2D imaging of 3D products based on tracking of 3D scanning of the 3D product for a variety of purposes. The present functionality may be used to improve efficiency in generating comprehensive 2D images by requiring fewer inputs from the user, while also precluding taking of redundant 2D images.

Turning now to the discussion of the improved object imaging in association with the user device 150, it is first noted that the user device 150 could implement the functionality for any of a variety of different applications, examples of which are described elsewhere herein. In particular, examples of the present disclosure describe functionality of the user device 150 to enable automatically generating 2D images that provide full coverage of a 3D product.

For example, FIG. 1 illustrates the user device 150 including an imaging engine 300. The user device 150 may generate 2D images using the imaging engine 300, and send one or more of the generated 2D images to a third-party device 1400 or a computing system 1000 for further processing. Although the imaging engine 300 is illustrated as distinct components of the user device 150, this is only an example. The imaging engine 300 could also or instead be provided by another component residing within or external to the user device 150.

While the imaging engine 300 is shown to form part of the user device 150, in other implementations, the imaging engine 300 may be provided at least in part by an alternative platform or computing system 1000. For simplicity, the present disclosure describes the operation of the imaging engine 300 when the imaging engine 300 is implemented in the user device 150, however this is not intended to be limiting. For example, at least some functions of the imaging engine 300 may additionally or alternatively be implemented on the computing system 1000 or the third-party device 1400.

The computing system 1000 is depicted having at least one processor 1004 and a memory 1002. The processor 1004 may be a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 1002 may include a volatile or non-volatile memory (e.g., a flash memory, a random access memory (RAM), and/or a read-only memory (ROM)). The memory 1002 may store instructions for execution by the processor 1004.

The user device 150 and the third-party device 1400 may each be any electronic device capable of capturing image data. Examples of suitable electronic devices include wearable devices (e.g., head-mounted display (HMD) devices, augmented reality (AR) glasses, smart watches, etc.) and/or mobile devices (e.g., smartphones, tablets, laptops, etc.), among others. Examples of the present disclosure may also be implemented in non-wearable devices and/or non-mobile devices, such as desktop computing devices, workstations, tracking systems, and other computing devices. Example components of the user device 150 are now described, which are not intended to be limiting. It should be understood that there may be different implementations of the user device 150.

The shown user device 150 includes at least one processing unit 151, such as a processor, a microprocessor, an application-specific integrated circuit (ASIC), a field-programmable gate array (FPGA), a dedicated logic circuitry, a graphics processing unit (GPU), a central processing unit (CPU), a dedicated artificial intelligence processor unit, or combinations thereof.

The user device 150 includes at least one memory 154, which may include a volatile or non-volatile memory (e.g., a flash memory, a random access memory (RAM), and/or a read-only memory (ROM)). The non-transitory memory 154 may store instructions for execution by the processing unit 151.

The user device 150 includes at least one network interface 156 for wired or wireless communication with an external system or network (e.g., an intranet, the Internet, a P2P network, a WAN and/or a LAN), and in particular for communication with the computing system 1000 and/or the third-party device 1400 in the example shown.

The user device 150 also includes at least one input/output (I/O) interface 158, which interfaces with input and output devices. In some examples, the same component may serve as both input and output device (e.g., a display 160 may be a touch-sensitive display). The user device 150 may include other input devices (e.g., buttons, microphone, touchscreen, keyboard, etc.) and other output devices (e.g., speaker, vibration unit, etc.).

The user device 150 is shown to further include a sensor system 162, which comprises one or more sensors. The sensors in the sensor system 162 are configured to capture two-dimensional (2D) images and/or three-dimensional (3D) topography data of a given 3D object from multiple perspectives. Each perspective of the 3D object may be defined by a certain viewing angle between the 3D object and the user device 150. For example, different perspectives of the 3D object may be obtained by moving the user device 150 relative to the stationary 3D object, by moving the 3D object relative to the stationary user device 150, or moving both the user device 150 and the 3D object relative to one another. The identification of new or unique perspectives of the 3D object will be discussed in greater detail.

In the depicted embodiment, the sensor system 162 includes sensors configured to capture 2D images of the 3D object, and configured to obtain 3D data of the 3D surface geometry or topology of the given 3D object. In that regard, the sensor system 162 may include an image capture device, such as a camera 164, that is adapted to capture 2D images of the 3D object from various angles between the camera 164 and the given 3D object. Alternatively, the image capture device may be a scanner, a charge-coupled device (CCD), a complementary metal-oxide semiconductor (CMOS) sensor, or other image capture device capable of capturing 2D images of a 3D object. The captured 2D images may also include associated metadata (e.g., a timestamp of the time a 2D image was captured, a geolocation where the 3D image was captured, an orientation of the user device 150 when the 3D image was captured, etc.), or the captured 2D images may be associated with such metadata.

To obtain 3D data of the 3D surface geometry or topology of the given 3D object, the sensor system 162 may include sensors that generate 3D topography data, such as 3D polygon meshes or 3D point clouds, and/or sensor data that can be used to generate 3D topography data. Additionally or alternatively, the sensor data may include a stream of 2D images, such as may, for example, be used to generate 3D topography data using photogrammetry techniques. Additionally or alternatively, the sensor data may include images such as may be taken concurrently from multiple cameras on the same device. Such cameras may be arranged or positioned so as to have differing perspectives. Notably, images from such an arrangement of cameras may be used to generate 3D topography data using knowledge of the placement of the cameras as the basis for differing perspectives. In the case of 3D polygon meshes, 3D polygon meshes contain the collection of vertices, edges, and faces that define the 3D object. Thus, the sensor system 162 may include photogrammetric technology that is capable of constructing a polygon mesh of the 3D object in real time. Alternatively, in the case of 3D point clouds, the sensor system 162 may include a LIDAR sensor 166. The LIDAR sensor 166 projects light towards the 3D object and detects light reflected off the surface topology of the 3D object. The 3D location and light intensity of each reflection are stored in the 3D point cloud. The sensor system 162 may include sensors that generate other 3D topography data as known in the field, other than 3D polygon meshes or 3D point clouds. Further, similar to the captured 2D images, generated 3D data may also be associated with metadata (e.g., a timestamp of the start and end of the capturing of 3D data, a geolocation where the 3D image was captured, etc.). In some applications, the sensors of the sensor system 162 may be external, but coupled, to the user device 150.

The at least one memory 154 of the user device 150 further includes the imaging engine 300, a software module that is executed by the processing unit 151 in communication with the sensors in the sensor system 162. The imaging engine 300 in the present embodiment generally includes a 2D image component 302, a 3D data component 304, an association module 308, and, optionally, an image selector 312.

The 3D data component 304 provides instructions to the processing unit 151 to generate 3D topography data of the 3D object using the photogrammetric technology or the LIDAR sensor 166. In particular, the 3D data component 304 provides instructions to the processing unit 151 to instruct the 3D data sensors to obtain 3D scanning data of the 3D object from multiple perspectives in real-time. The 3D scanning data of the 3D object may be the polygon mesh data, 3D point cloud data or stream of 2D images, and may include 3D data points corresponding to a first perspective and subsequent perspectives of the 3D object relative to the user device 150. During scanning, the 3D data component 304 may further provide instructions to the user (via the I/O interface 158) to rotate the 3D object within the field of view of the device's sensor and/or to move the user device 150 around the 3D object in order to obtain the 3D data points corresponding to the first and subsequent perspectives of the 3D object. The 3D data component 304 provides further instructions to the processing unit 151 to begin to build the 3D polygon mesh (or 3D point cloud or 3D topography) of the 3D object iteratively. Notably, the 3D data component 304 also comprises instructions for the processing unit 151 to label and track the position of each 3D data point, (such as each mesh polygon, for example) as the 3D object and/or the user device 150 is moved.

The 2D image component 302 provides instructions to the processing unit 151 to capture the 2D images using the camera 164. The 2D image component 302, when executed by the processing unit 151, instructs the camera 164 to obtain 2D images of the 3D object in real-time. The 2D image component 302 may further instruct the processing unit 151 to generate and collect metadata related to each 2D image, and associate the captured 2D images with their corresponding metadata.

When the 3D scanning first begins, the 2D image component 302 is configured to instruct the camera 164 (via the processing unit 151) to take an initial 2D image of the 3D object from the first perspective. The 2D image component 302 and the 3D data component 304 are further configured to send their respective 2D image and 3D data points (that correspond to the first perspective) to the association module 308. The association module 308 is adapted to link or associate that first 2D image with the first 3D data points/mesh polygons generated and labeled from the first perspective. The initial 2D image and the initial 3D data points/mesh polygons may be saved in the memory 154 and may be associated with a first marker, flag, or timestamp 310 (or other identifier). The marker, flag, or timestamp 310 may include the time in which the data was obtained and/or another identification technique may be applied to distinguish the initial 2D image and the initial 3D data points from subsequent 2D images and subsequent 3D data points. For example, the timestamp may be pulled from the metadata associated with that 2D image. As the 3D object and/or the user device 150 moves, the 3D data component 304 continues to instruct the 3D sensor to generate and label new 3D data points/mesh polygons. Even when the 3D object and/or the user device 150 is still or not moving, the 3D data component 304 may continue to instruct the processing unit 151 to label and track the position of each 3D data point, (such as each mesh polygon, for example). Movement of the 3D object and/or the user device 150 can be detected by, for example, tracking changes in point clouds or polygons from frame to frame, and/or movement of the user device 150 may be detected using a motion sensor (not shown) of the sensor system 162 (e.g., accelerometer, gyroscope, etc.).

The 3D data component 304 further comprises a 3D data analyzer 306 that is configured to track and count which 3D data points/mesh are newly generated and have not been saved since the previous marker, frame, flag, or timestamp 310 (or associated with the first 2D image). When the 3D data analyzer 306, as executed by the processing unit 151, determines that the number of new unsaved data points/mesh polygons generated by the 3D sensor exceeds a predetermined threshold, this indicates to the 3D data analyzer 306 that the 3D object has been moved into a new perspective relative to the user device 150. The 3D data analyzer 306 is then configured to automatically send a signal, via the processing unit 151, to the 2D image component 302 to instruct the camera 164 to take a subsequent 2D image of the 3D object from this new perspective. The 2D image component 302 and the 3D data component 304 are further configured to send the subsequent 2D image and the subsequently generated 3D data points (or mesh polygons) to the association module 308 for the association module 308 to link the subsequent 2D image with the subsequently generated 3D data points together, to optionally associate them with a subsequent marker, flag, or timestamp 310 (or other identifier), and to optionally save them in the memory 154. The subsequently generated 3D data points may also be added to the set of 3D scanning data of the 3D object.

The 3D data component 304 is configured to instruct the processing unit 151 to continue obtaining 3D data points from the 3D sensor, tracking and counting new 3D data points, identifying a new subsequent perspective, and automatically triggering the 2D image component 302 to instruct the processing unit 151 to capture a 2D image of the 3D object (with the camera 164) in the new subsequent perspective in response. The 3D data component 304 is configured to repeat such operations (i.e., obtaining 3D data points from the 3D sensor, tracking new 3D data points to identify a new subsequent perspective, and capturing a new 2D image of the new subsequent perspective, collectively considered one iteration) until a complete 3D model (mesh or point cloud) of the 3D object is obtained by the 3D data component 304. Each time a new 2D image from a subsequent perspective of the 3D object is taken, the 2D image component 302 and the 3D data component 304 are configured to instruct the processing unit 151 to send the new 2D image and the corresponding 3D data points to the association module 308, via the processing unit 151, for linking, and optionally subsequent timestamp association, and saving.

After the complete 3D model of the 3D object is obtained by the 3D data component 304, the 3D data component 304 may be configured to instruct the processing unit 151 to stop obtaining 3D data points from the 3D sensor, tracking and counting new 3D data points, and capturing new 2D images etc. Since the 2D image component 302 instructs the camera 164 to capture 2D images until the complete 3D mesh model is produced, the generated 2D images collectively provide comprehensive views of all of the unique external aspects of the 3D object. The use of the 2D image component 302 and the 3D data component 304 helps to ensure that the resulting 2D images provide a full coverage view of the 3D object.

In some implementations, the 3D data component 304 may be configured to instruct the processing unit 151 to stop obtaining 3D data points from the 3D sensor, tracking and counting new 3D data points, and capturing new 2D images etc. before a complete 3D model of the 3D object is obtained. For example, the 3D data component 304 may be configured to stop after a predetermined number of iterations, and/or after a predetermined number of 2D images are captured. In any event, the 2D image component 302 is configured to instruct the processing unit 151 to capture (via the camera 164) 2D images of the 3D object from a first and subsequent perspectives.

In this manner, the disclosed system automatically generates 2D images that fully cover the 3D object. These automatically generated 2D images may be used for a variety of different applications, including commerce/e-commerce applications, record-keeping or archival purposes, artistic or academic submissions, or remote mechanical diagnoses.

Depending on the application, the imaging engine 300 may, optionally, further include the image selector 312, which may be configured to instruct the processing unit 151 to receive the captured 2D images and their associated 3D scanning data from the association module 308. Once received, in some implementations, the image selector 312 may be configured to instruct the processing unit 151 to send all of the captured 2D images of the 3D object to computing system 1000 or the third-party device 1400 for further processing. This may be preferable over sending the 3D scanning data since sending 2D images over a network is typically less data intensive than sending 3D scanned data.

In other implementations, the image selector 312 may be configured to instruct the processing unit 151 to send one, or a subset, of the captured 2D images of the 3D object to the computing system 1000 or the third-party device 1400 for further processing. In such cases, the image selector 312 may be configured to select or identify the one/subset of 2D image(s) to be sent. The image selector 312 may be configured to instruct the processing unit 151 to select the one/subset of 2D image(s) based on different criteria or logic rules, depending on the application of the 2D images.

In cases where the application includes comparing the 3D object with a reference 3D object, the image selector 312 may comprise a comparison module 314, which comprises instructions for execution by the processing unit 151 to compare the set of 3D scanning data of the 3D object with a reference 3D model 316 of the 3D object. For example, if the application involves identifying defects in the 3D object, the comparison module 314 may further be configured to instruct the processing unit 151 to identify non-matching 3D data points between the 3D scanning data of the 3D object and the reference 3D model 316, where the non-matching 3D data points (or discrepancies) indicate a possible defect in the 3D object. The discrepancy may be determined based on the absolute difference between the 3D scanning data of the 3D object and the reference model 316 or based on the distortion percentage of the non-matching 3D data points, when the absolute difference or distortion percentage exceeds predetermined thresholds. The predetermined (distortion) thresholds may differ between 3D objects and may be decided based on the particular properties of the 3D object. For example, the distortion threshold for a soft object may be much higher than the distortion threshold for a hard object. In some cases, depending on the 3D object, a higher number of difference or distortion may be accepted in some portions of the object than others.

The reference 3D model 316 of the 3D object may be saved on the user device 150 (for example in the memory 154) which, in some applications, may have been downloaded from memory 1002 on the computing system 1000. The user device 150 may, alternatively, have received the reference 3D model 316 from the third-party device 1400.

When the comparison module 314, via the processing unit 151, identifies discrepancies between the 3D scanning data of the 3D object and the reference 3D model 316, the discrepancies indicate that a defect in the 3D object may be present. The location of the discrepancies may also indicate where the defect on the 3D object may be located. If/when the comparison module 314 identifies discrepancies or a defect, the comparison module 314 may be configured to identify the non-matching 3D data points/mesh polygons. The image selector 312 may then be configured to identify the one or more corresponding 2D images that is or are linked and associated with the non-matching 3D data points/mesh polygons. Put another way, the one or more 2D images that carry the same markers, flags, or timestamps 310 (or other identifiers) as the non-matching 3D data points/mesh polygons may be identified by the image selector 312 as the corresponding 2D image(s) (i.e. that shows the defect).

In some implementations, the comparison module 314 may be configured to instruct the processing unit 151 to identify which of the discrepancies is the greatest. To that end, the 3D data points may be ranked according to the number or amount of discrepancies (such as the absolute difference or distortion percentage) with regards to the reference 3D model. The image selector 312 may then identify the corresponding 2D image(s) that is/are linked to the highest-ranked 3D data point, or that are linked to the highest-ranked predetermined number/proportion of 3D data points. In another implementation, the image selector 312 may be configured to instruct the processing unit 151 to identify the 2D image that is linked to or associated with the greatest number of 3D data points/mesh polygon distortions relative to the reference 3D model 316. For example, a distortion may be found for a given 3D data point/mesh polygon when the absolute difference between that given 3D data point/mesh polygon and its corresponding 3D data point/mesh polygon in the reference 3D model 316 (i.e. non-matching 3D data points/mesh polygons) exceeds a predetermined threshold. Determining which 3D data points have the greatest discrepancies and/or identifying which 2D image is associated with the greatest number of distortions (relative to the reference 3D model 316) may result in identification of a 2D image (or multiple 2D images) that best shows the defect or damage to the 3D object.

The identified corresponding 2D image(s) may then be sent by the user device 150 to the third-party device 1400 and/or the computing system 1000 for further processing. In this manner, the disclosed systems automatically generate 2D images that fully cover the 3D object and identify the 2D image(s) that most likely show the area of interest. This enables more effective generation of data, as it precludes taking of redundant 2D images, and avoids having to send more data than necessary, as only the most relevant 2D images may be selected and sent for further processing.

The disclosed systems also provide an easy and intuitive interface for the user, since the number of inputs the user or customer must enter in order to generate comprehensive images of the 3D object is minimized. The user merely has to initiate the method/application on the user device and move the 3D object relative to the user device, and/or move the user device around the 3D object as the user device 3D scans the 3D object and automatically generates 2D images while ensuring sufficient coverage of the 3D object. The recipient of the 2D images can also rely on the generated 2D images and 3D scanning data, knowing that the generated 2D images provide a full view of the 3D object.

The disclosed systems may enable generation and automatic identification of 2D images that correlate to surface details or defects that are detectable by the sensors of the user device 150. Existing consumer devices (e.g., smartphones) may be equipped with sensors capable of identifying structural defects in the 3D object. Future consumer devices may be equipped with sensors that are more sensitive and, thus, capable of identifying even smaller surface details (e.g., capable of detecting microscale topology), such as scratches or other surface textures. The present disclosure is not limited by the capabilities of existing consumer devices.

Alternatively, rather than identifying particular 2D images to send to the e-computing system 1000 or the third-party device 1400, the image selector 312 may be configured to send all of the captured 2D images to the third-party device 1400 or the computing system 1000 without the above-described comparisons of the 3D models. In addition to the automatic generation of the 2D images, as noted above, the use of the disclosed example system also helps to assure the recipient that the resulting 2D images provides a full coverage view of the 3D object.

Example e-Commerce Implementations

An example of an e-commerce platform and a user device configured to perform the above is described below. However, it should be understood that this discussion is only for the purpose of illustrating an example e-commerce platform and is not intended to be limiting as to the nature of an e-commerce system with which the subject matter of the present application may be implemented. Further, it should be understood that the present disclosure may be implemented in other contexts, and is not necessarily limited to implementation in an e-commerce platform and a user device. For example, the present disclosure may be implemented in the context of any other platform that supports service instances (e.g., a web hosting platform), without necessarily supporting any e-commerce. Other such possibilities are contemplated within the scope of the present disclosure.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 2:
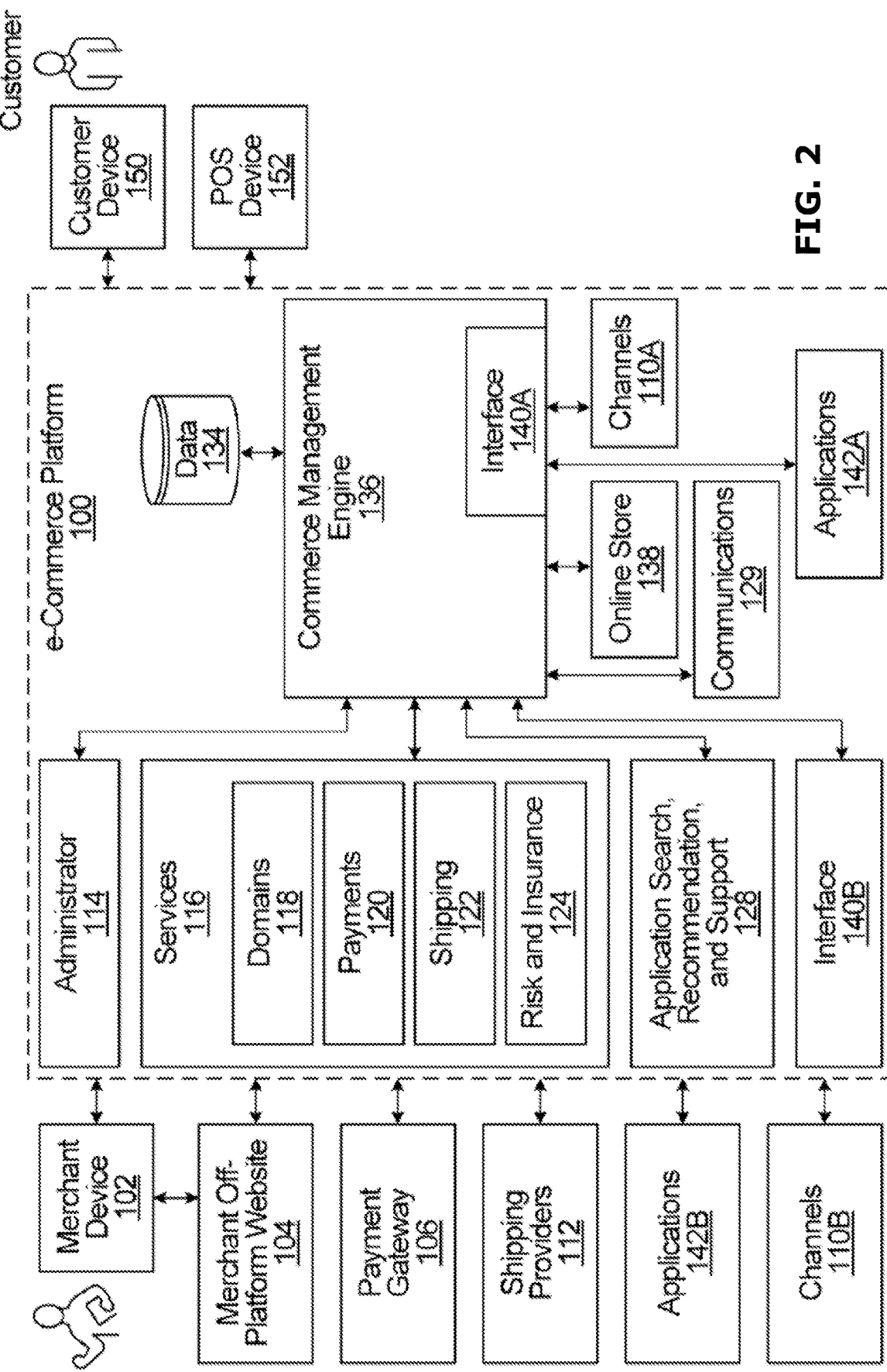
FIG. 2 is a block diagram of an example e-commerce platform and a customer device, which may be an example implementation of the system of FIG. 1.

FIG. 2 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 2, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 3:
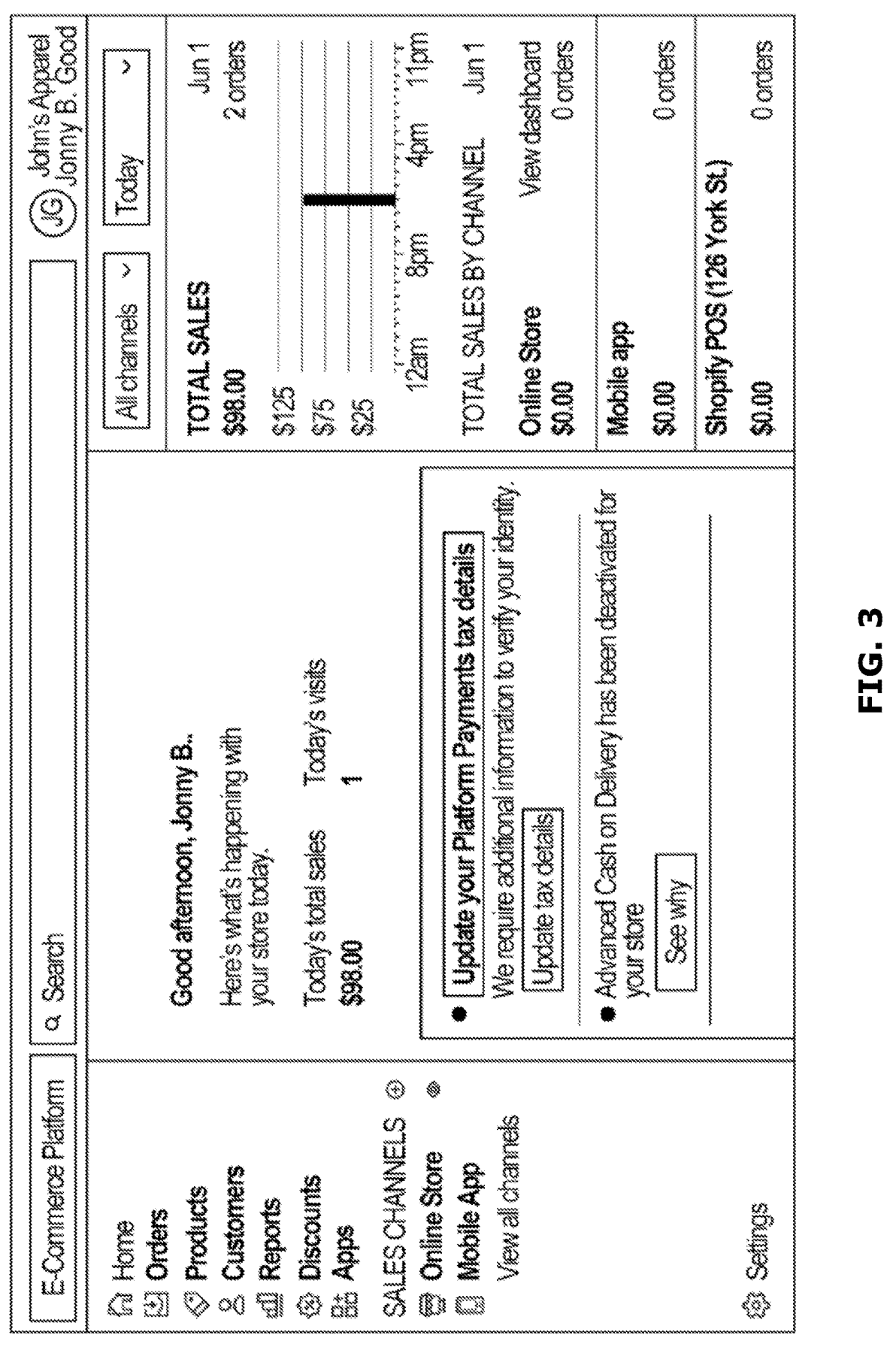

FIG. 3 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalogue, managing orders, and/or the like. In some embodiments, the merchant may be able to access the different sections of the administrator 114 by using a sidebar, such as the one shown on FIG. 3. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 2, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales) (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component.

Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location.

An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

In some examples, the applications 142A-B may include an application that enables a user interface (UI) to be displayed on the customer device 150. In particular, the e-commerce platform 100 may provide functionality to enable content associated with an online store 138 to be displayed on the customer device 150 via a UI.

Implementation on a User Device with an e-Commerce Platform

Having discussed an example e-commerce platform, discussion of systems and methods of tracking 3D scans and automatically generating 2D images that provide full coverage of a 3D product, as may be employed in association with such platforms and a user device is provided. In some implementations, the functionality described herein may be used in commerce to provide improved customer or buyer experiences. The functionality described herein may also be used in commerce to provide improved merchant experiences.

For example, after a customer has purchased a product from the e-commerce platform, there may be follow-up issues with the purchase for a number of reasons. The product may be defective, and/or the customer might wish to return the product. Unlike brick and mortar stores, the e-commerce merchant is unable to physically inspect the product to verify the customer's issue. However, e-commerce merchants would still require, or at least prefer, to review the product before addressing the customer's complaint or request.

Conventionally, the process for an e-commerce customer to generate evidence of the condition or defect of the product in question (such that the evidence is satisfactory for the merchant), tends to be non-intuitive, complicated, may require technical knowledge that not all customers have, or may be insufficient. For example, the customer may send a picture of the (defective) product to the merchant. However, the picture may not provide sufficient information to the merchant. In some instances, the merchant can only take the customer's word that the item is defective or in a re-sellable condition. In many cases, the merchant may not ask for any verification at all, as there is no known simple and consistent method of doing so.

As described above, the present disclosure provides user-friendly systems for generating comprehensive 2D images of a 3D object, such as 2D images that can be used when a customer raises an issue with a purchased product. In various examples, the disclosed systems and methods may help to ensure that sufficient 2D images are captured such that the 2D images provide views of the 3D object from different perspectives (e.g., sufficient to ensure full coverage of the 3D object), without requiring additional/needless user input or prompts. Further, in some examples, the disclosed systems and methods may enable automatic identification of a 2D image that shows a point of interest (e.g., a defect) in the 3D object, without requiring manual selection. In this way, user interactions may be greatly simplified and computing resources may be used more efficiently.

Accordingly, example systems and methods for providing automatic 2D image generation of a 3D product will be described in the context of e-commerce, including how such 3D data tracking and image generation may, in at least some embodiments, be implemented with a user device in concert with an e-commerce platform.

Figure 4:
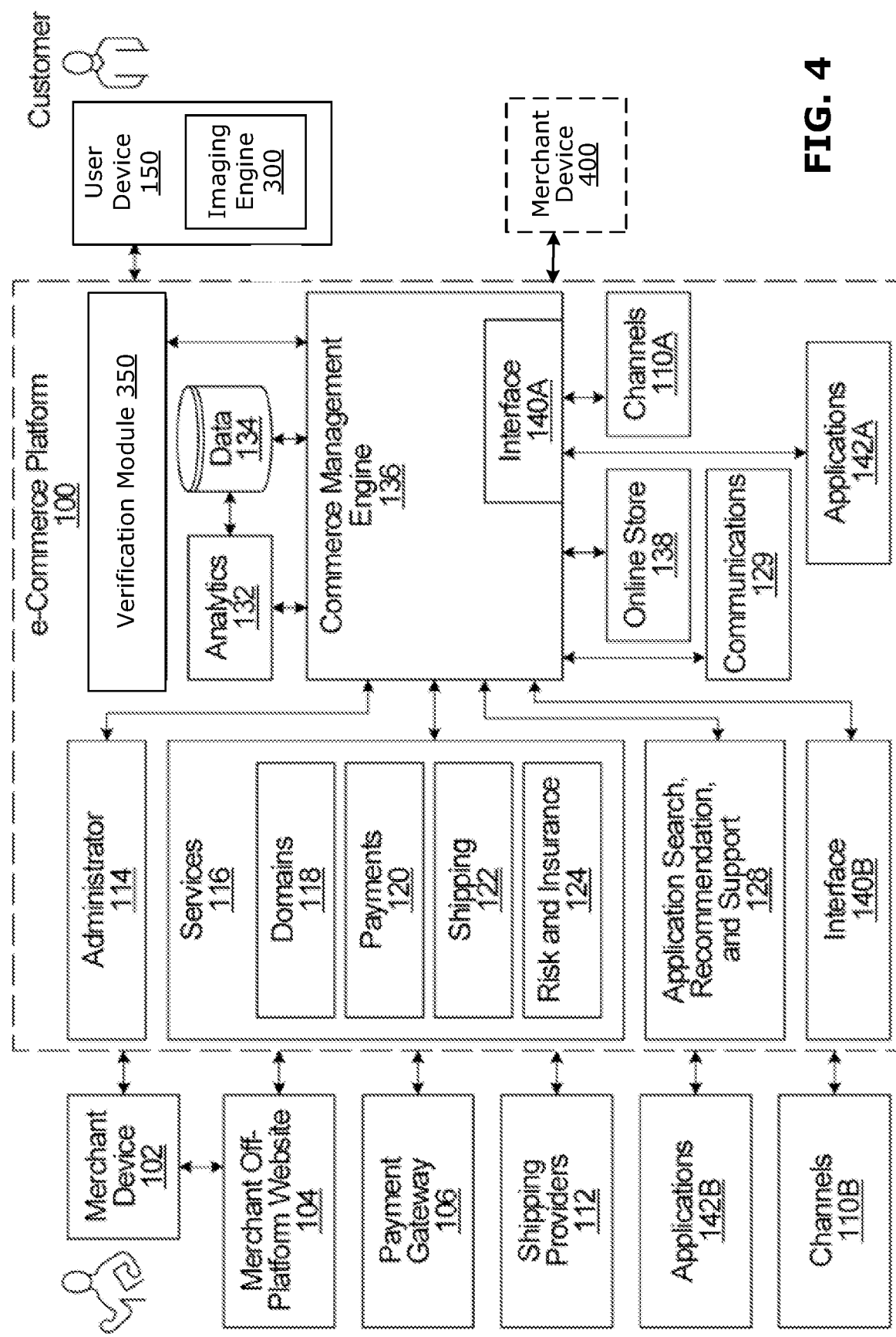
FIG. 4 is another block diagram of the example e-commerce platform including a verification module and the customer device of FIG. 1 with the imaging engine, in which examples described herein may be implemented.

For example, FIG. 4 illustrates the e-commerce platform 100 of FIG. 2 coupled to the user device 150 (see above), but including, respectively, a verification module 350 and the imaging engine 300. As described above, the user device 150 may generate 2D images using the imaging engine 300. When in use with the e-commerce platform 100 (which may be an instance of the computing system 1000 of FIG. 1), the user device 150 may send one or more of the generated 2D images to the verification module 350 of the e-commerce platform 100 or a merchant device 400 (which may be an instance of the third-party device 1400 of FIG. 1) to verify the condition of the disputed product.

Although the imaging engine 300 and the verification module 350 are illustrated as distinct components of the user device 150 and the e-commerce platform 100 in FIG. 4, this is only an example. The imaging engine 300 and the verification module 350 could also or instead be provided by another component residing within or external to the user device 150 and the e-commerce platform 100. In some embodiments, either or both of the applications 142A-B may provide an embodiment of the verification module 350 that implement the functionality described herein. The location of the imaging engine 300 and the verification module 350 may be implementation specific.

While the imaging engine 300 is shown to form part of the user device 150, in other implementations, the imaging engine 300 may be provided at least in part by the e-commerce platform 100, either as a core function of the e-commerce platform 100 or as one or more applications or services supported by or communicating with the e-commerce platform 100. For example, at least some functions of the imaging engine 300 may additionally or alternatively be implemented on the e-commerce system 100. At least some functions of the verification module 350 may additionally or alternatively be implemented on the user device 150.

In some implementations, the examples disclosed herein may be implemented using a different platform that is not necessarily (or is not limited to) the e-commerce platform 100. In general, examples of the present disclosure are not intended to be limited to implementation on the user device 150 and the e-commerce platform 100.

Figure 5:
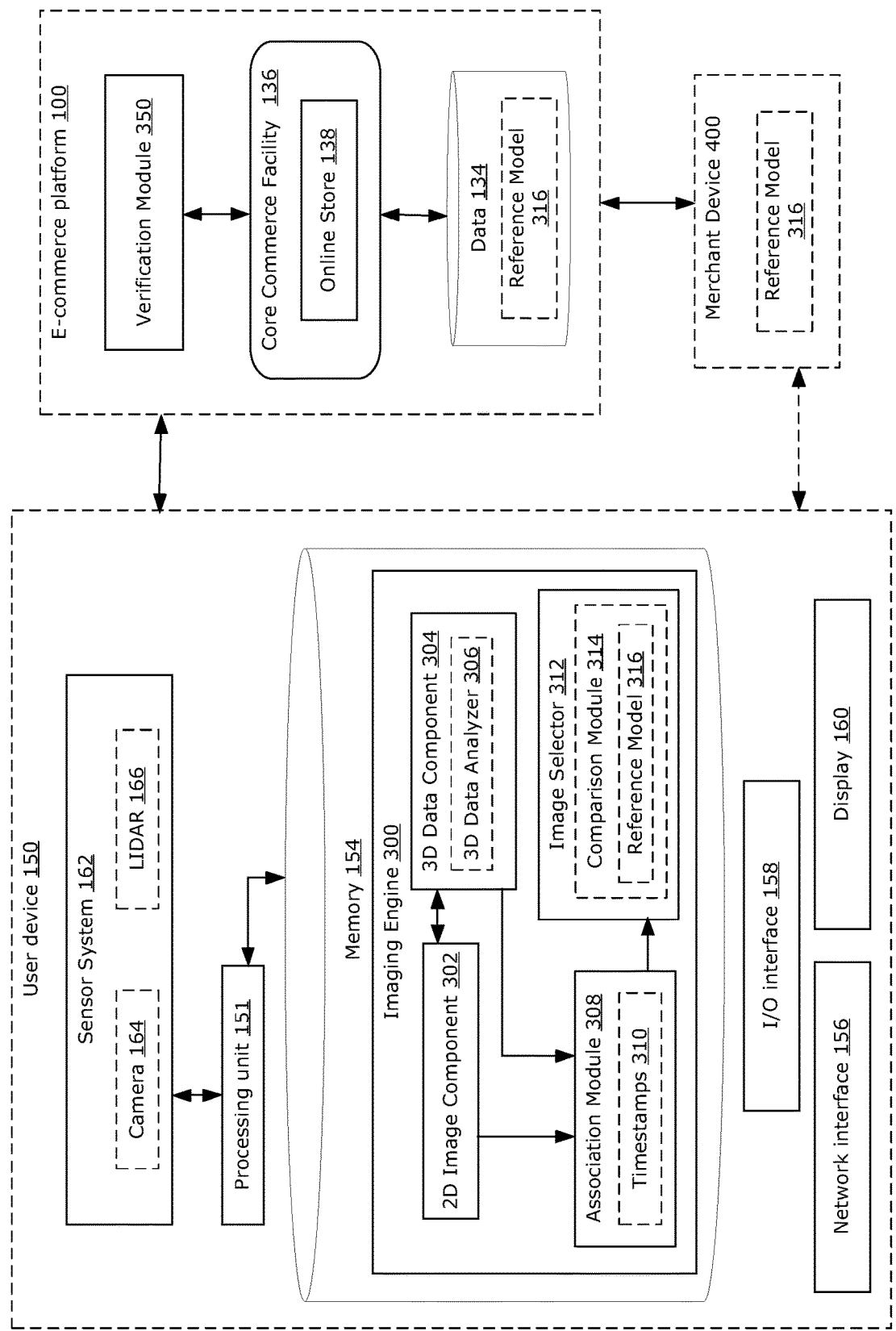
FIG. 5 is another block diagram of the e-commerce platform and the user device of FIG. 4, showing details related to the imaging engine and the verification module according to an embodiment.

FIG. 5 is another depiction of the user device 150 and the e-commerce platform 100 that omits some details that have been described with reference to FIG. 2, and shows further details of the imaging engine 300 discussed above. In particular, FIG. 5 illustrates some example details of the user device 150 and the e-commerce platform 100 that are relevant to automatically generating 2D images that provide full coverage of a 3D product. Some details of the e-commerce platform 100 are not shown, to avoid clutter. FIG. 5 illustrates other computing systems interacting with the user device 150 and the e-commerce platform 100, including the merchant device 400.

In the illustrated implementation of FIG. 5, the imaging engine 300 includes the image selector 312 with the comparison module 314, which comprises instructions for execution by the processing unit 151 to compare the set of 3D scanning data of the 3D object (or 3D product at issue) with a reference 3D model 316 of the 3D product. As described above, the comparison module 314 may be configured to instruct the processing unit 151 to identify non-matching 3D data points between the 3D scanning data of the 3D object and the reference 3D model 316, where the non-matching 3D data points (or discrepancies) indicate a possible defect in the 3D object.

The reference 3D model 316 of the 3D object may be saved on the user device 150 (for example in the memory 154) which, in some applications, may have been downloaded from the data facility 134 on the e-commerce platform 100. The user device 150 may, alternatively, have received the reference 3D model 316 from the merchant device 400.

When the comparison module 314 identifies discrepancies between the 3D scanning data of the 3D object and the reference 3D model 316, the discrepancies indicate that a defect in the 3D object may be present. If/when the comparison module 314 identifies discrepancies or a defect, the comparison module 314 is configured to identify the non-matching 3D data points/mesh polygons. The image selector 312 is then configured to identify the one or more corresponding 2D images that is or are linked and associated with the non-matching 3D data points/mesh polygons.

In some implementations, the comparison module 314 may be configured to instruct the processing unit 151 to identify which of the discrepancies is the greatest as described above. The identified corresponding 2D image(s) may then be sent by the user device 150 to the merchant device 400 and/or the e-commerce platform 100 for further verification. In this manner, the disclosed systems automatically generate 2D images that fully cover the 3D object and identify the 2D image(s) that most likely show the defect of interest. This enables more effective generation of data, as it precludes taking of redundant 2D images, and avoids having to send more data than necessary, as only the most relevant 2D images may be selected and sent for verification. The recipient of the 2D images can also rely on the generated 2D images and 3D scanning data, knowing that the generated 2D images provide a full view of the 3D object.

Alternatively, rather than identifying particular 2D images to send to the e-commerce platform 100 or the merchant device 400, the image selector 312 may be configured to send all of the captured 2D images to the merchant device 400 or the e-commerce platform 100 without the above-described comparisons of the 3D models. As noted above, the use of the disclosed example systems help to assure the merchant or the e-commerce platform 100 that the resulting 2D images provide a full coverage view of the 3D object.

In the present case, the merchant device 400 and/or the e-commerce system 100 may include the verification module 350. The verification module 350 is configured to receive the one or more 2D images of the 3D object from the image selector 312 and to present them for visual inspection at the e-commerce platform 100. Alternatively, the verification module 350 may be configured to identify which online store 138 the 3D object is associated with, and to provide the 2D images to the merchant device 400 that corresponds with the relevant online store 138 for visual inspection. A user or inspector at the merchant device 400 or the e-commerce platform 100 may then review the 2D images to visually verify whether a defect is present in the 3D object. The verification module 350 is then configured to receive an indication of the inspector's conclusion and to save the images as evidence of the defect of the 3D object.

If all of the 2D images were sent to the verification module 350, the user or inspector may identify the one or more 2D images that (best) show the defect. The verification module 350 may then be configured to receive an indication from the user or inspector regarding which 2D images are relevant, and to save those images as evidence of the defect in the 3D object.

Rather than finding or identifying defects, imaging engine 300 and the verification module 350 may be configured to verify the condition of the 3D object.

In a similar manner as noted above, the comparison module 314 may be configured to compare the 3D data model of the 3D object with the saved reference 3D model 316 of the original object. If a discrepancy is identified by the comparison module 314, the non-matching 3D data points/mesh polygons and their corresponding 2D image(s) may be identified by the image selector 312 and sent to the verification module 350 of the merchant device 400 or the e-commerce platform 100 for further verification.

Alternatively, the image selector 312 may be configured to send all of the captured 2D images to the merchant device 400 or the e-commerce platform 100 without the above-described comparisons of the 3D models. The verification module 350 may then be configured to present all of the 2D images for review to verify the condition of the 3D object, and receive indication to save the 2D images as evidence of the 3D object's condition.

While the imaging engine 300 is shown to form part of the user device 150, as mentioned above, the imaging engine 300 may be provided at least in part by the e-commerce platform 100, either as a core function of the e-commerce platform 100 or as one or more applications or services supported by or communicating with the e-commerce platform 100.

Figure 6:
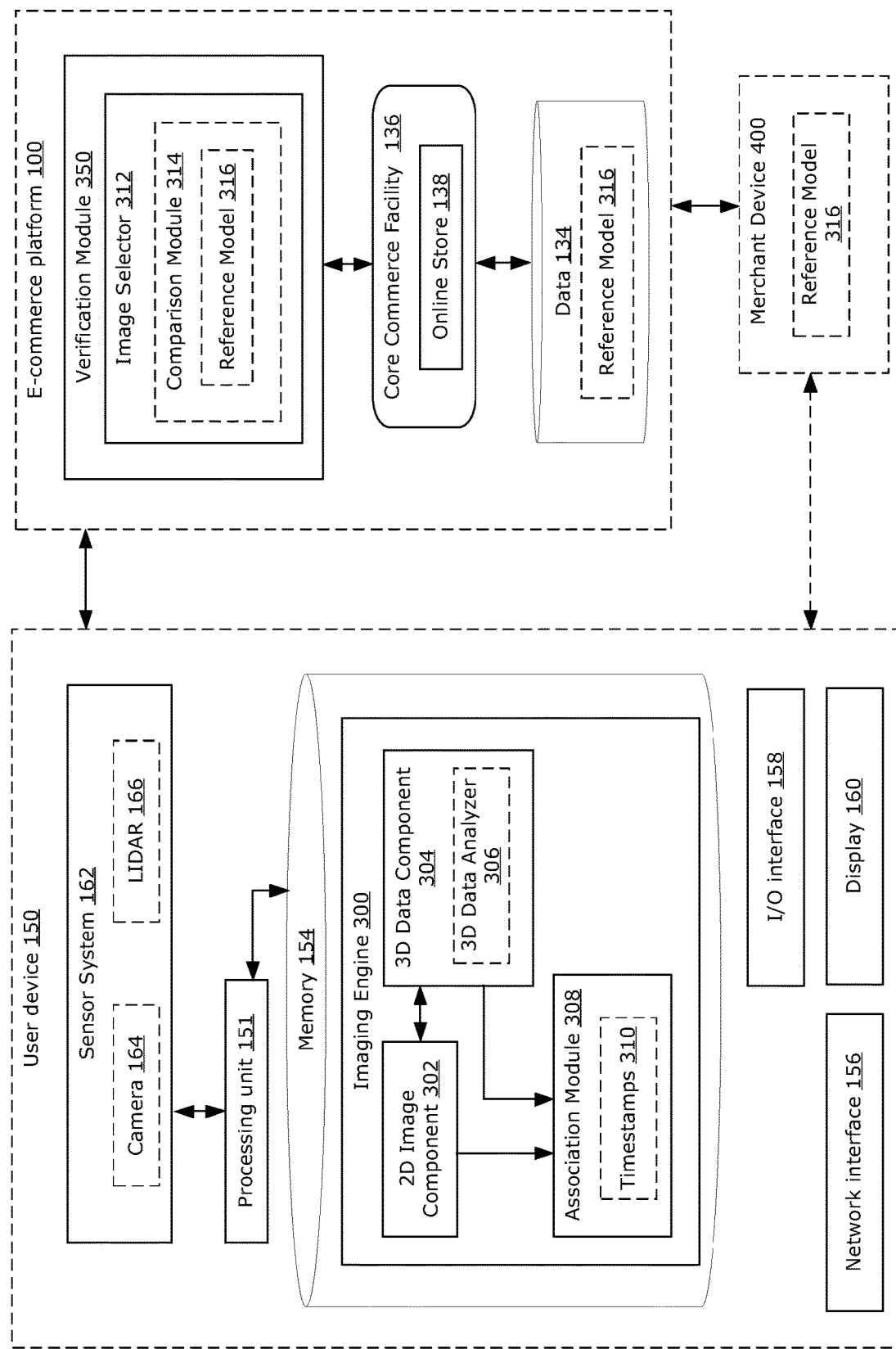
FIG. 6 is a block diagram of an alternate embodiment of the e-commerce platform and the user device of FIG. 5, showing details related to the imaging engine and the verification module according to an alternate embodiment.

FIG. 6 is a depiction of an alternative embodiment of the user device 150 and the e-commerce system 100, where the image selector 312 now forms part of the verification module 350 in the e-commerce platform 100, rather than the imaging engine 300 of the user device 150, as in FIG. 5.

In this embodiment, similar to the above, the sensor system 162, the imaging engine 300, and their respective components are configured as described above. The image selector 312 is still configured to receive captured 2D images and their associated 3D scanning data from the association module 308. However, as the comparison module 314 is implemented on the e-commerce platform 100, the reference 3D model 316 of the 3D object does not have to be saved or transferred to the user device 150 for use by the comparison module 314. In that regard, the association module 308 in the present embodiment is configured to additionally send all of the 2D images of the 3D object and their associated 3D scanning data to the image selector 312 in the verification module 350 on the e-commerce platform 100.

In the present case, the image selector 312 may not be configured to send any of the 2D images to the verification module 350. Once the image selector 312 identifies/selects which 2D images are most relevant, the selected 2D images may be presented to the user or inspector at the e-commerce platform 100 or the merchant device 400 for further visual inspection as described above.

Figure 7:
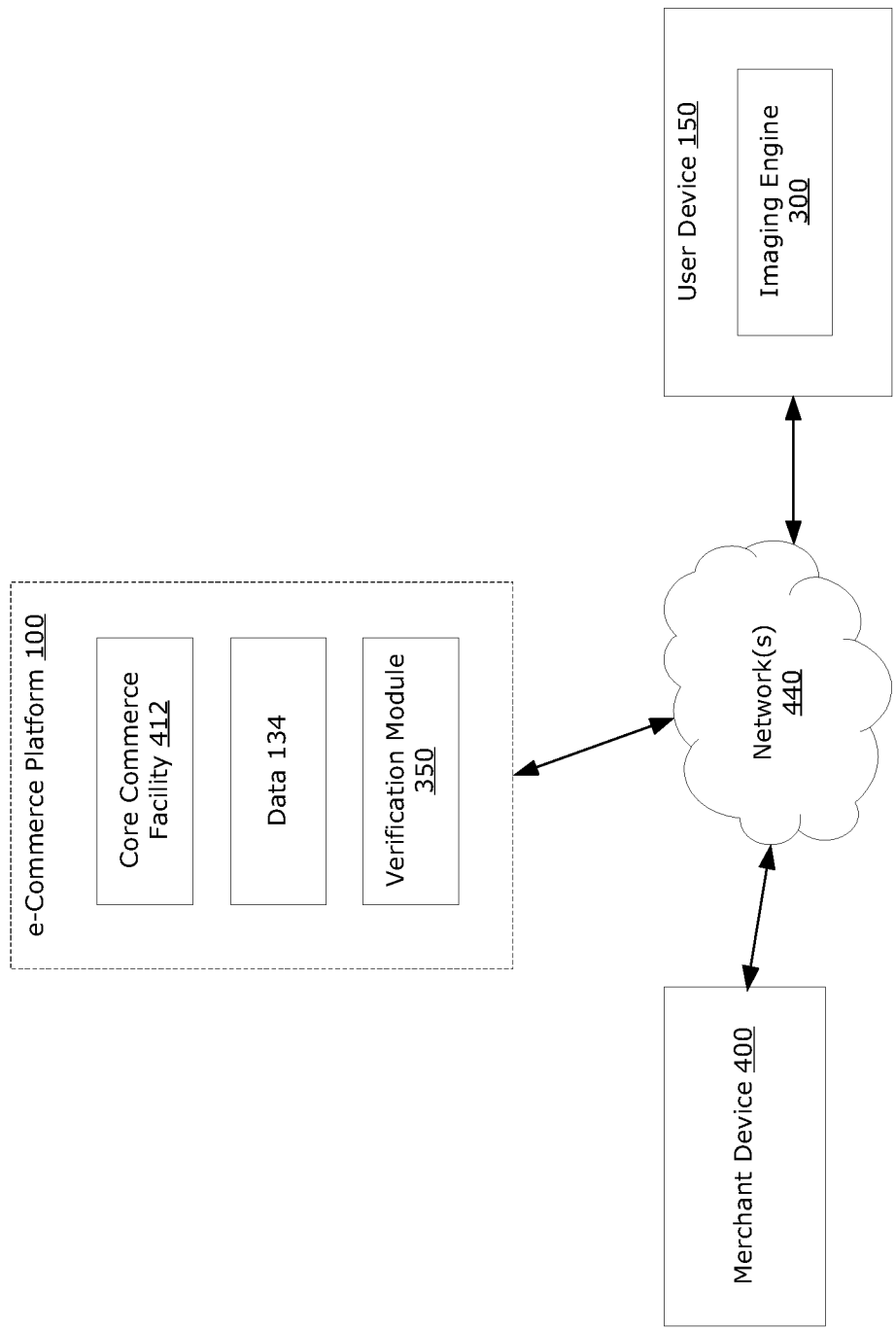
FIG. 7 is a block diagram illustrating an example implementation of the e-commerce platform and user device of FIG. 5.

FIG. 7 is a block diagram of an example hardware configuration of the e-commerce platform 100 in communication with the merchant device 400 and the user device 150. For simplicity, one merchant device 400 and one customer device 150 is shown in FIG. 7, however it should be understood that there may be any number of merchant devices 400 and customer devices 150 in communication with the e-commerce platform 100. Merchants and customers, using respective devices 400 and 150 may access the e-commerce platform 100 via one or more networks 440 (e.g., wired and/or wireless networks, including a virtual private network (VPN), the Internet, and the like).

For example, in the embodiment shown in FIG. 5, the image selector 312 may, using the network interface 156 of the user device 150, send the selected 2D images wirelessly to the verification module 350 (e.g., via a wireless network such as the Internet). In other examples, the image selector 312 may use a short-range wireless interface of the user device 550 (e.g., a Bluetooth or ZigBee interface) to send the 2D images to the verification module 350. In other examples, a wired connection may be used to send the 2D images to the verification module 350. Other mechanisms for transmitting the 2D images from the user device 150 to the e-commerce system 100 may be used. In a similar manner, the association module 308, as in the embodiment shown in FIG. 6, may send the 2D images and the associated 3D scanning data wirelessly to the verification module 350 in the e-commerce platform 100, using a short-range wireless interface, and/or through a wired connection.

Although FIG. 7 illustrates an example hardware implementation of the e-commerce platform 100, it should be understood that other implementations may be possible. For example, there may be greater or fewer numbers of servers, the e-commerce platform 100 may be implemented in a distributed manner, where the memories may be replaced with external storage or cloud-based storage, among other possible modifications.

One of the advantages of the example systems and methods disclosed herein, is that they may help to minimize the number of inputs the user or customer must enter in order to generate comprehensive evidence of the condition of a disputed product/3D object. The user merely has to initiate the system on the user device and move the 3D object relative to the user device, and/or move the user device around the 3D object. The disclosed systems 3D scan the 3D object and automatically generate 2D images while ensuring sufficient coverage of the 3D object, and without requiring additional inputs from the user. The disclosed systems also help to avoid having to send more data than necessary, as (in the pertinent cases) only the most relevant 2D images may be selected and sent for verification.

The merchant and the e-commerce platform can also rely on the generated 2D images and 3D scanning data as evidence of the condition of the 3D object when a customer raises an issue, knowing that the generated 2D images provide a full view of the 3D object.

Method

Figure 8:
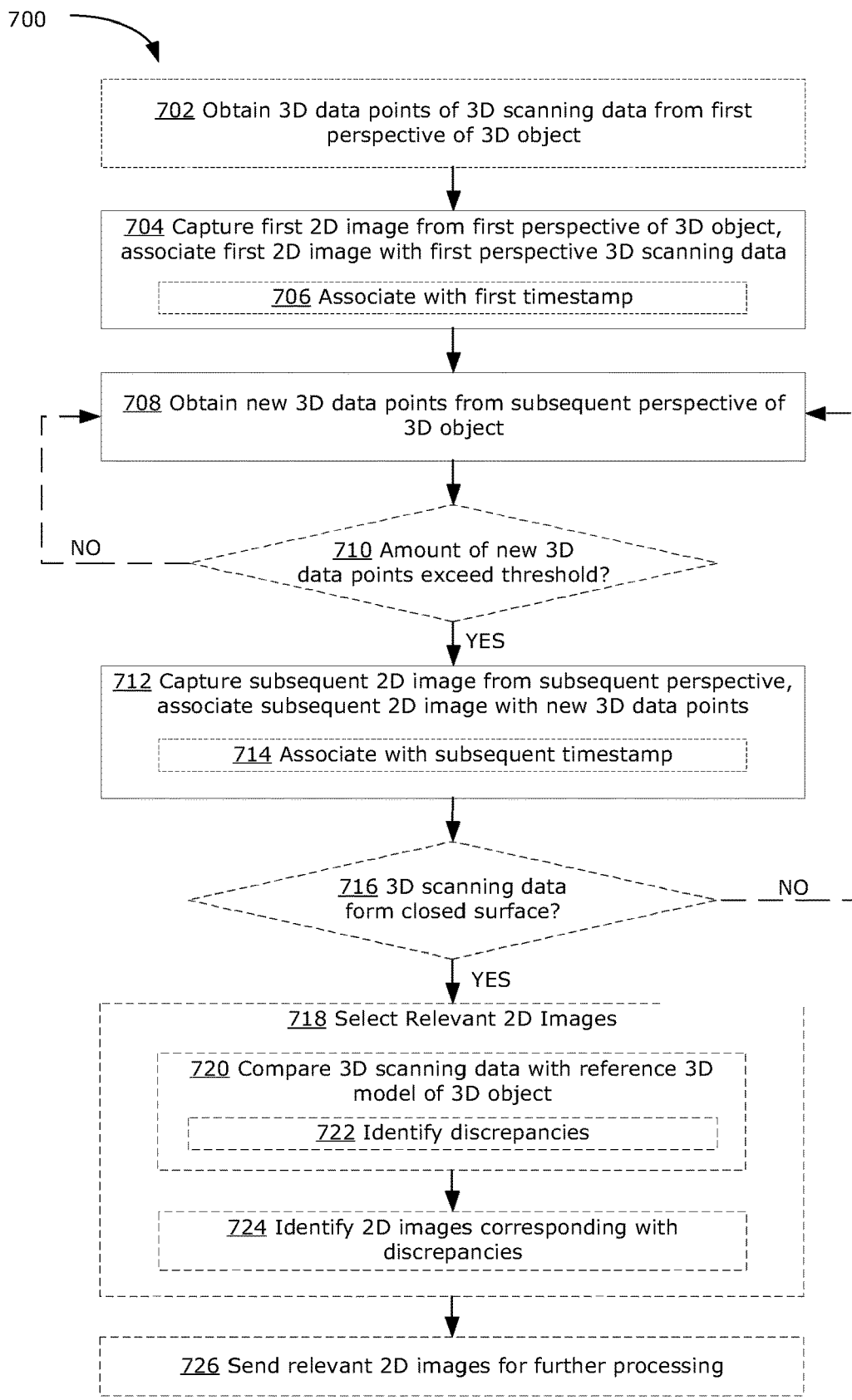
FIG. 8 is a flowchart illustrating a method for image generation according to examples of the present disclosure.

FIG. 8 is a flowchart illustrating an example method 700 for scanning a 3D object and automatically generating 2D images that provide full coverage of the 3D object. The example method 700 may be performed by the user device 150, the computing system 1000, and/or the e-commerce platform 100 as described above using the imaging engine 300 and the verification module 350, for example. In particular, the method 700 may be performed in real-time (or near real-time) by the user.

At an operation 702, 3D data points of a set of 3D scanning data from a first perspective of a given 3D object may be obtained. For example, the 3D data points may be obtained with a 3D scanning device, which may be combined with photogrammetric technology to construct a polygon mesh of the 3D object. The 3D scanning device may alternatively be a LIDAR sensor. In that regard, the 3D data points may take other forms, such as a 3D point cloud.

At an operation 704, a first 2D image of the 3D object is captured from the first perspective of the 3D object. The first 2D image may be captured by a camera. The first 2D image is further associated with the 3D data points of the 3D scanning data obtained from the first perspective of the 3D object.

Optionally, at an operation 706, a first marker, flag, or timestamp (or other identifier) may also be associated with the first 2D image and the 3D data points that are in the set of 3D scanning data at the time the first 2D image is captured.

The marker, flag, or timestamp 310 may include the time in which the data was obtained and/or another identification technique may be applied to distinguish the initial 2D image and the initial 3D data points from subsequent 2D images and subsequent 3D data points. The initial 2D image, its associated initial 3D data points, and their associated timestamp may also be saved.

At an operation 708, new 3D data points from a subsequent perspective of the 3D object are obtained and included in the set of 3D scanning data, where the new 3D data points do not generally overlap with the 3D data points already in the set of 3D scanning data. To capture the surface of the 3D object from the subsequent perspective, the user may be instructed to move (e.g., rotate) the 3D object within the field of view of the user device's camera and 3D scanning device and/or to move the user device around the 3D object. The new 3D data points (obtained subsequent to the 3D data points that were saved and associated with the first perspective) are tracked and counted.

At 710, a determination is made whether the number of the new 3D data points obtained exceeds a predetermined threshold. If the number of new 3D points does not meet or exceed (i.e. is below) the predetermined threshold, the method 700 returns to the operation at 708 to continue obtaining new 3D points from the subsequent perspective of the 3D object because the 3D object or the user device has not been sufficiently moved relative to each other such that there is a sufficiently unique (or "new") perspective between the 3D object and the camera.

If the number of the new 3D points does exceed (i.e. is above) the predetermined threshold, the method 700 moves to an operation 712, where a subsequent 2D image is automatically captured (for example, by the camera) from that subsequent perspective. The subsequent 2D image is automatically captured because the 3D object or the user device has been moved relative to each other such that there is a sufficiently unique (or "new") perspective between the 3D object and the camera. Thus, the predetermined threshold at 710 may be adjusted based on the desired level of comprehensiveness and/or redundancy in the number of 2D images of the 3D object that are to be automatically captured using this method.

Further, at the operation 712, similar to the operation at 704, the subsequent 2D image is associated with the new 3D data points obtained up until that point (after the initial 3D points were obtained).

At an operation 714, a subsequent marker, flag, or timestamp (or other identifier) may also be associated with the subsequent 2D image and the subsequent 3D data points associated with the subsequent 2D image. The subsequent marker, flag, or timestamp 310 may include the time in which the subsequent 2D image was obtained and/or following the identification technique applied at the operation 706. The subsequent 2D image, its associated subsequent 3D data points, and their associated subsequent timestamp may also be saved.

Optionally, the operations 708, 710, 712, and 714 may be repeated iteratively, where new subsequent 3D data points (such as the mesh polygons or points in the point cloud) may be obtained, tracked, labelled, and stored, and new subsequent 2D images may be captured, associated with the corresponding 3D data points, labelled, and stored as the 3D object and/or the user device is rotated relative to one another. For example, the operations 708 to 714 may be repeated for a predetermined number of iterations, and/or may be repeated until a predetermined number of 2D images are captured.

In the depicted implementation, the operations 708 to 714 may be repeated until the 3D scanning data forms a closed surface representing the 3D object. Thus, at 716, a determination is made whether the 3D scanning data collectively form a closed surface (forming a 3D model of the 3D object). If the 3D scanning data does not form a closed surface, the 3D model of the 3D object is incomplete. The method 700 then returns to the operation at 708 and continues obtaining new 3D data points from the subsequent view of the 3D object. If the 3D scanning data is found to form a closed surface, the 3D model of the 3D object is considered complete.

In any of the above cases, 2D images are automatically generated as the 3D object is scanned. If/when a complete 3D model is produced, the generated 2D images then also collectively provide comprehensive views of all the unique external aspects of the 3D object. The use of the disclosed method ensures that the resulting 2D images provide a full coverage view of the 3D object.

After the 3D model and the corresponding 2D images of the 3D object are obtained and captured, the 3D model and the corresponding 2D images may have a number of uses as discussed herein.

In the case where the 3D object is to be compared to a reference 3D object in order to identify regions of interest, at an operation 718, particular 2D images that are relevant to the region of interest may be selected. In some implementations, all of the 2D images captured at the operations 704 and 712 may be considered relevant and selected at the operation 718.

However, in other implementations, only a subset of the captured 2D images may be considered relevant. To determine which 2D images are relevant, at an operation 720, the set of 3D scanning data of the 3D object may be compared with a reference 3D model of the 3D object to identify non-matching 3D data points therebetween. The reference 3D model of the 3D object may have been received from the computing system 1000 or received from the third-party device 1400. The non-matching 3D data points, or discrepancies, would indicate the region of interest in the 3D object.

At an operation 722, the discrepancies may be identified. The discrepancy may be determined based on the absolute difference between the 3D scanning data of the 3D object and the reference model 316 or based on the distortion percentage of the non-matching 3D data points, when the absolute difference or distortion percentage exceeds predetermined thresholds. The predetermined (distortion) thresholds may differ between 3D objects and may be decided based on the particular properties of the 3D object. For example, the distortion threshold for a soft object may be much higher than the distortion threshold for a hard object. In some cases, depending on the 3D object, a higher level of difference or distortion may be accepted in some portions of the object than others.

At an operation 724, if/when discrepancies are identified, the particular non-matching 3D data points/mesh polygons are identified and the one or more 2D images that is or are linked and associated with the non-matching 3D data points/mesh polygons may then be identified. Put another way, the one or more 2D images that carry the same markers, flags, or timestamps 310 (or other identifier) as the non-matching 3D data points/polygons may be identified at the operation 724. These images would be identified as the relevant 2D images that show the region of interest in the 3D object.

In order to further narrow down the 2D images, the method 700 may further include identifying which of the discrepancies is the greatest, i.e. which of the absolute differences or distortion percentages between the non-matching 3D data points is the greatest, or which portion of the 3D scanning data has the greatest number of discrepancies. This would indicate the presence of the biggest (or the most likely location of the) defect. The 2D image(s) that corresponds with the greatest discrepancy may be identified (as the 2D images that best show the defect). Put another way, the 2D images that are linked to or associated with 3D data points that have the highest value (or greatest number of) distortions relative to the reference 3D model may be selected. Such a determination may help in narrowing down the 2D images to those that best shows the defect or damage to the 3D object, i.e. that are the most relevant for defect detection.

At an operation 726, the selected 2D image(s) may then be sent to the third-party device 1400 and/or the computing system 1000 for further processing.

Alternatively, at the operation 726, as noted above, all of the captured 2D images may be sent to the third-party device 1400 or the computing system 1000 without the above-described comparisons of the 3D models. The use of the disclosed systems and methods assure the recipient that the resulting 2D images provide a full coverage view of the 3D object.

Alternatively, all of the captured 2D images may be sent to the third-party device 1400 or the computing system 1000 (at the operation 726) without the above-described comparisons of the 3D models. Again, the use of the disclosed example systems and methods assures the recipient that the resulting 2D images provide a full coverage view of the 3D object.

In that manner, method 700 helps to minimize the number of inputs the user must enter in order to generate comprehensive image of the 3D object. The user merely has to initiate the method on the user device and move the 3D object relative to the user device, and/or move the user device around the 3D object as the user device 3D scans the 3D object and automatically generates 2D images while ensuring sufficient coverage of the 3D object, and without requiring additional inputs from the user. The recipient can also rely on the generated 2D images and 3D scanning data, knowing that the generated 2D images provide a full view of the 3D object. Processing power may be saved since the processor has fewer inputs to process before the desired outcome is achieved. Method 700 also helps to enable more effective generation of data, as it precludes taking of redundant 2D images, and avoids having to send more data than necessary, as only the most relevant 2D images may be selected and sent for verification. This may be particularly beneficial in the case where the user device 150 has limited resources (e.g., is a handheld mobile device, which typically has fewer computer resources compared to desktop devices).

The method 700 may be used, for example, in e-commerce applications, such as with the e-commerce platform 100 and the merchant device 400. The 3D model and the corresponding 2D images may be used, among other things, for detection of defects in the 3D object or product and/or to verify the condition of the 3D object.

If a customer is alleging a defect in a product that was purchased (i.e. the 3D object), the merchant may wish to have evidence of the defect before proceeding with reparations. In that regard, at the operation 718, particular 2D images that are relevant to the defect may be selected. Depending on the defect alleged, all of the 2D images captured at the operations 704 and 712 may be considered relevant to the defect and selected at the operation 718.

However, in other implementations, only a subset of the captured 2D images may be considered relevant. To determine which 2D images are relevant, at the operation 720, the set of 3D scanning data of the 3D object may be compared with a reference 3D model of the 3D object to identify non-matching 3D data points therebetween. The reference 3D model of the 3D object may have been received from the e-commerce platform 100 or received from the merchant device 400. The non-matching 3D data points, or discrepancies, would indicate a possible defect in the 3D object.

At the operation 722, the discrepancies or defects may be identified as described above. At the operation 724, if/when discrepancies indicating a defect is identified, the particular non-matching 3D data points/mesh polygons are identified and the one or more 2D images that is or are linked and associated with the non-matching 3D data points/mesh polygons may then be identified. These images would be identified as the relevant 2D images that show the defect in the 3D object.

In order to further narrow down the 2D images, the method 700 may identify which of the discrepancies is the greatest. Such a determination may help in narrowing down the 2D images to those that best shows the defect or damage to the 3D object, i.e. that are the most relevant for defect detection.

At the operation 726, the selected 2D image(s) may then be sent to the merchant device 400 and/or the e-commerce platform 100 for further or final verification of the defect. If the merchant confirms the presence of the defect, the merchant may provide a return, send a replacement product, or proceed with other such reparations.

Alternatively, at the operation 726, as noted above, all of the captured 2D images may be sent to the merchant device 400 or the e-commerce platform 100 without the above-described comparisons of the 3D models. The use of the disclosed systems and methods assure the merchant or the e-commerce platform that the resulting 2D images provide a full coverage view of the 3D object. The merchant or an administrator at the e-commerce platform may then review all of the captured 2D images to visually identify the 2D image that shows the defect, which may then be saved as evidence of the defect.

In the case where the customer is requesting to return the product (i.e., the 3D object), the merchant or the e-commerce platform may wish to verify that the product is in a new, unused, and re-sellable condition.

In a similar manner as described above, the relevant 2D images may be selected at the operation 718 by comparing the 3D mesh model of the 3D object (to be returned) with the reference 3D model of the original product/3D object (at the operation 720). If a discrepancy is identified (at the operation 722), the non-matching 3D data points/mesh polygons and their corresponding 2D image(s) may be identified (at the operation 724) and sent to the merchant device 400 or e-commerce platform 100 (at the operation 726) for verification whether the product/3D object is in a re-sellable (and therefore, returnable) condition.

Alternatively, also in a similar manner as described above, all of the captured 2D images may be sent to the merchant device 400 or the e-commerce platform 100 (at the operation 726) without the above-described comparisons of the 3D models. Again, the use of the disclosed example systems and methods assures the merchant or the e-commerce platform that the resulting 2D images provide a full coverage view of the 3D object. The merchant or an administrator at the e-commerce platform may then review all of the 2D images to visually verify the condition of the product/3D object, which may then be saved as evidence of the product's condition. If the product/3D object is determined to be in a new, unused, and re-sellable condition, the merchant may then proceed with the return process.

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. An imaging system comprising:
a processing unit configured to execute instructions to cause the system to:
capture a three-dimensional (3D) scan of a 3D object over a plurality of iterations, wherein performing one iteration comprises:
obtaining 3D data points corresponding to a particular perspective of the 3D object;
continue obtaining 3D data points without capturing any two-dimensional (2D) images until it is determined that the obtained 3D data points include a number of new 3D data points that exceed a predetermined threshold, the new 3D data points being obtained 3D data points that are non-overlapping with 3D data points already stored in a set of 3D scanning data;
responsive to determining that the number of new 3D data points exceeds a predetermined threshold, automatically capturing a 2D image corresponding to the particular perspective of the 3D object; and
storing the new 3D data points corresponding to the particular perspective of the 3D object in the set of 3D scanning data and storing the 2D image in association with the stored new 3D data points;
wherein one or more further iterations are performed for different perspectives of the 3D object until a complete 3D scan of the 3D object is captured or a predetermined number of iterations has been performed.

2. The system of claim 1, wherein the processing unit is further configured to:
determine that the complete 3D scan of the 3D object is captured based on determining that the set of 3D scanning data forms a closed surface;
automatically end the plurality of iterations; and
store the set of 3D scanning data as a 3D model with the associated 2D images captured over the plurality of iterations.

3. The system of claim 1, further comprising:
a scanning device configured to obtain the 3D data points of the set of 3D scanning data for the different perspectives of the 3D object over the plurality of iterations; and
an image capture device configured to capture the 2D images over the plurality of iterations.

4. The system of claim 1, wherein the processing unit is further configured to, in each iteration, associate a timestamp with the 2D image and also associate the timestamp with the 3D data points that are in the set of 3D scanning data at the time the 2D image is captured.

5. The system of claim 4, wherein the processing unit is further configured to compare the set of 3D scanning data of the 3D object with a reference 3D model of the 3D object to identify non-matching 3D data points therebetween, the non-matching 3D data points indicating a possible defect in the 3D object.

6. The system of claim 5, wherein the processing unit is further configured to identify one or more corresponding 2D images, from the captured 2D images, with a same timestamp as that of the non-matching 3D data points, the one or more corresponding 2D images showing the defect.

7. The system of claim 6, wherein the processing unit is further configured to provide the one or more corresponding 2D images to an e-commerce platform or to a merchant device.

8. The system of claim 1, wherein the processing unit is further configured to provide instructions to a user to move the 3D object or the scanning device to change to the different perspectives of the 3D object.

9. A computer-implemented method comprising:
capturing a three-dimensional (3D) scan of a 3D object over a plurality of iterations, wherein performing one iteration comprises:
obtaining 3D data points corresponding to a particular perspective of the 3D object;
continue obtaining 3D data points without capturing any two-dimensional (2D) images until it is determined that the obtained 3D data points include a number of new 3D data points that exceed a predetermined threshold, the new 3D data points being obtained 3D data points that are non-overlapping with 3D data points already stored in a set of 3D scanning data;
responsive to determining that the number of new 3D data points exceeds a predetermined threshold, automatically capturing a 2D image corresponding to the particular perspective of the 3D object; and
storing the new 3D data points corresponding to the particular perspective of the 3D object in the set of 3D scanning data and storing the 2D image in association with the stored new 3D data points;
wherein one or more further iterations are performed for different perspectives of the 3D object until a complete 3D scan of the 3D object is captured or a predetermined number of iterations has been performed.

10. The method of claim 9, further comprising:
determining that the complete 3D scan of the 3D object is captured based on determining that the set of 3D scanning data forms a closed surface;
automatically ending the plurality of iterations; and
storing the set of 3D scanning data as a 3D model with the associated 2D images captured over the plurality of iterations.

11. The method of claim 9, obtaining, with a scanning device, the 3D data points of the set of 3D scanning data for the different perspectives of the 3D object over the plurality of iterations.

12. The method of claim 9, further comprising, in each iteration, associating a timestamp with the 2D image and also associated the timestamp with the 3D data points that are in the set of 3D scanning data at the time the 2D image is captured.

13. The method of claim 12, further comprising comparing the set of 3D scanning data of the 3D object with a reference 3D model of the 3D object to identify non-matching 3D data points therebetween, the non-matching 3D data points indicating a possible defect in the 3D object.

14. The method of claim 13, further comprising identifying one or more corresponding 2D images, from the captured 2D images, with a same timestamp as that of the non-matching 3D data points, the one or more corresponding 2D images showing the defect.

15. The method of claim 14, further comprising providing the one or more corresponding 2D images to an e-commerce platform or to a merchant device.

16. The method of claim 13, further comprising receiving the reference 3D model of the 3D object from an e-commerce platform or from a merchant device.

17. The method of claim 9, further comprising providing instructions to a user to move the 3D object or the scanning device to change to the different perspectives of the 3D object.

18. The method of claim 9, wherein the set of 3D scanning data comprises polygon mesh data.

19. The method of claim 9, further comprising providing one or more of the 2D images captured over the plurality of iterations to an e-commerce platform or to a merchant device.

20. A non-transitory computer-readable medium storing instructions that, when executed by a processor of a system, causes the system to:
capture a three-dimensional (3D) scan of a 3D object over a plurality of iterations, wherein performing one iteration comprises:
obtaining 3D data points corresponding to a particular perspective of the 3D object;
continue obtaining 3D data points without capturing any two-dimensional (2D) images until it is determined that the obtained 3D data points include a number of new 3D data points that exceed a predetermined threshold, the new 3D data points being obtained 3D data points that are non-overlapping with 3D data points already stored in a set of 3D scanning data;
responsive to determining that the number of new 3D data points exceeds a predetermined threshold, automatically capturing a 2D image corresponding to the particular perspective of the 3D object; and
storing the new 3D data points corresponding to the particular perspective of the 3D object in the set of 3D scanning data and storing the 2D image in association with the stored new 3D data points;
wherein one or more further iterations are performed for different perspectives of the 3D object until a complete 3D scan of the 3D object is captured or a predetermined number of iterations has been performed.

* * * * *